United States Patent [19]

Nishikawa et al.

[11] 4,242,923

[45] Jan. 6, 1981

[54] LUBRICATION IN POWER TRANSMISSION UNIT

[75] Inventors: Kazuyoshi Nishikawa; Makoto Uno, both of Toyota, Japan

[73] Assignee: Toyota Jidosha Kogyo Kabushiki Kaisha, Aichi, Japan

[21] Appl. No.: 935,776

[22] Filed: Aug. 22, 1978

[30] Foreign Application Priority Data

Nov. 2, 1977 [JP] Japan ............................ 52-132287
Nov. 2, 1977 [JP] Japan ............................ 52-132288

[51] Int. Cl.$^2$ ............................................ F16H 37/08
[52] U.S. Cl. ...................................... 74/700; 74/467; 74/606 R; 184/6.12
[58] Field of Search ............... 74/700, 467, 373, 359, 74/606 R, 606 A, 694; 184/6.12

[56] References Cited

U.S. PATENT DOCUMENTS

| | | | |
|---|---|---|---|
| 2,805,743 | 9/1957 | Keese | 74/700 X |
| 3,115,047 | 12/1963 | Lunn et al. | 74/359 X |

*Primary Examiner*—Philip C. Kannan

*Attorney, Agent, or Firm*—Armstrong, Nikaido, Marmelstein & Kubovcik

[57] ABSTRACT

A power transmission unit comprises a change-speed gearing having a mainshaft with change-speed gears and a countershaft with counter gears for selectively driving the respective change-speed gears, and a drive pinion shaft coaxially connected to the mainshaft and having a drive pinion driving a crown wheel, the drive pinion shaft being supported by a pair of axially spaced bearings carried on an upright partition wall in a transaxle casing. In the power transmission unit, a stirring member is mounted on one of the mainshaft and countershaft to dip up lubrication oil in a rear chamber behind the partition wall, an oil receiver is secured to the rear-face of the partition wall to receive the lubrication oil dipped up by rotation of the stirring member, an axial cavity is provided on the partition wall adjacent the drive pinion shaft to receive the lubrication oil from the oil receiver, and a lateral passage is provided through the partition wall to communicate the cavity into an annular space around the drive pinion shaft between the bearings.

11 Claims, 12 Drawing Figures

LUBRICATION IN POWER TRANSMISSION UNIT

BACKGROUND OF THE INVENTION

The present invention relates generally to a power transmission unit for a motor vehicle, and more particularly to a power transmission unit of the type which comprises a trans-axle casing rigidly secured at its upright front seating face to a cylinder block of an engine and having an upper compartment to contain therein a disengageable coupling for connection to a crankshaft of the engine and a lower compartment to contain therein a final drive gearing and a differential gear unit, and a transmission casing sealingly jointed at its upright front seating face to the upright rear seating face of the trans-axle casing to contain therein a change-speed gearing drivingly connected to an output member of the disengageable coupling, and in which the trans-axle casing is provided therein with an upright partition wall to subdivide the lower compartment into front and rear chambers, and the final drive gearing includes a drive pinion shaft supported by a pair of axially spaced bearings carried on the partition wall and having a drive pinion in mesh with a crown wheel to drive the differential gear unit, the drive pinion shaft being coaxially connected to the change-speed gearing.

In such a final drive gearing of the type as described above, the bearing facing to the front chamber is directly splashed with lubrication oil dipped up by rotation of the crown wheel, but the bearing facing to the rear chamber may not be splashed with the dipped up lubrication oil. It is, therefore, necessary to positively lubricate the latter bearing so as to ensure durability of the power transmission unit.

SUMMARY OF THE INVENTION

Accordingly, it is a primary object of the present invention to provide an improved power transmission unit in which a simple lubricating device is provided to sufficiently lubricate both bearings for the drive pinion shaft.

In a preferred embodiment of the present invention, the primary object is accomplished by providing a power transmission unit which comprises stirring means mounted on one of the mainshaft and countershaft of the change-speed gearing to dip up lubrication oil in the rear chamber, an oil receiver secured to the rear-face of the partition wall to receive the lubrication oil dipped up by rotation of the stirring means, an axial cavity provided on the partition wall adjacent the drive pinion shaft and opening toward the rear chamber to receive the lubrication oil from the oil receiver, and a lateral passage provided through the partition wall to communicate the cavity into an annular space around the drive pinion shaft between the bearings.

According to a feature of the present invention, the stirring means may comprise an additional change-speed gear fixed to the mainshaft, a counter gear journalled on the countershaft and in mesh with the additional gear, and an additional synchronizer journalled on the countershaft to establish synchronism in a driving connection between the counter gear and the countershaft, the additional gears and synchronizer being arranged under the oil receiver.

According to another feature of the present invention, the oil receiver may comprise a lateral gutter member secured to the rear-face of the partition wall to lead lubrication oil into the axial cavity and a longitudinal gutter member secured at its front end to the lateral gutter member and at its rear end to an inner wall of the trans-axle casing to receive the lubrication oil dipped up by rotation of the stirring means.

BRIEF DESCRIPTION OF THE DRAWINGS

Additional objects and advantages of the present invention will be more readily apparent from the following detailed description of preferred embodiments thereof when taken together with the accompanying drawings, in which.

DESCRIPTION OF THE PREFERRED EMBODIMENTS

Figure 1:
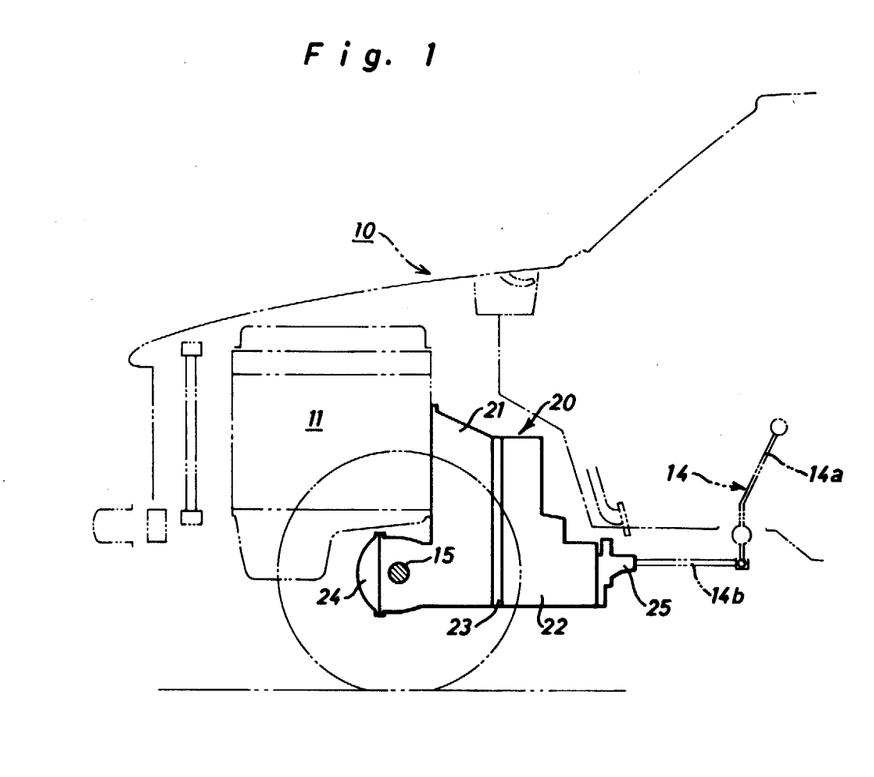
FIG. 1 is a schematic side view of a motor vehicle equipped with a power transmission unit in accordance with the present invention.
Figure 2:
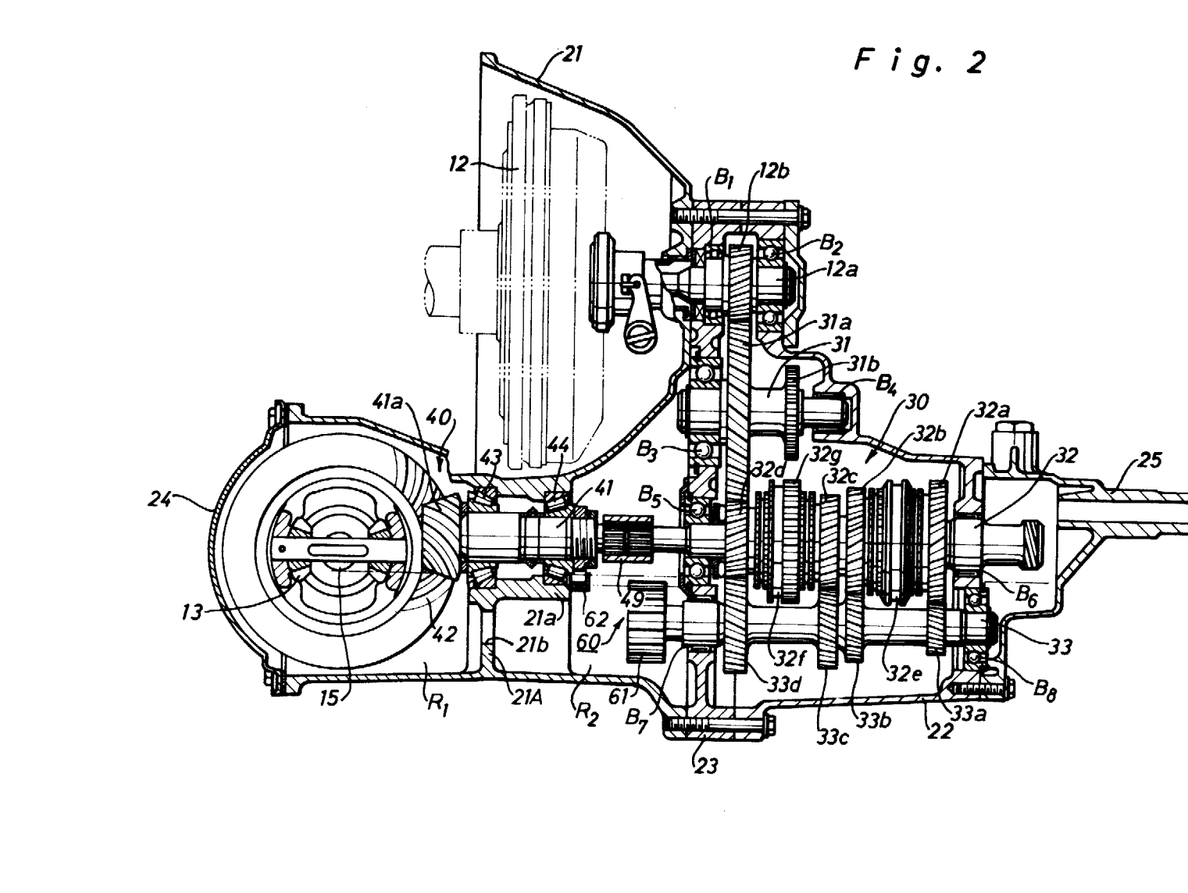
FIG. 2 is an enlarged sectional view of the transmission unit.

Referring now to the drawings, in particular to FIG. 1, there is illustrated a power transmission unit which is mounted on a motor vehicle 10 of the type of front-engine and front-wheel drive. A housing assembly 20 for the transmission unit comprises a trans-axle casing 21 and a transmission casing 22 which are fluid-tightly jointed to each other by way of an upright intermediate plate 23. The trans-axle casing 21 is rigidly secured at its upright front seating face to an upright rear seating face of a cylinder block of an engine 11 and, as well shown in FIG. 2, is configured generally to conform with a friction clutch 12 contained in the upper compartment thereof and to conform with a final drive gearing 40 and a differential gear unit 13 contained in the lower compartment thereof. The lower compartment of trans-axle casing 21 is sealingly closed by a dome-shaped cover plate 24 to retain lubrication oil within the housing assembly 20.

The transmission casing 22 is fluid-tightly secured at its upright front seating face to the upright rear seating face of trans-axle casing 21 by way of the intermediate plate 23 and is configured generally to conform with a change-speed gearing 30 contained therein. The change-speed gearing 30 is drivingly connected at one hand thereof to the crankshaft of engine 11 through the friction clutch 12 and connected at the other hand thereof to the differential gear unit 13 through the final drive gearing 40. In addition, an extension housing 25 is fluid-tightly secured to the rear end seating face of transmission casing 22 to complete the housing assembly 20.

The friction clutch 12 has a power input member for connection to the crankshaft of engine 11 and a power output member 12a supported by a pair of axially spaced bearings $B_1$ and $B_2$ respectively from the intermediate plate 23 and from the transmission casing 22. The power output member 12a is formed with a driving gear 12b located between the bearings $B_1$ and $B_2$ and is further surrounded by a seal member to keep foreign matter out of the casing 22 and to retain lubrication oil within the casing 22. An idler shaft 31 is supported by a pair of axially spaced bearings $B_3$ and $B_4$ respectively from the intermediate plate 23 and from the transmission casing 22 and is also formed with an idler gear 31a and a reverse driving gear 31b. The idler gear 31a is permanently meshed with the driving gear 12b on the power output member 12a, and the reverse driving gear 31b is axially spaced from the idler gear 31a and adjacent the right-hand bearing $B_4$.

The change-speed gearing 30 includes an output mainshaft 32 which is supported by a pair of axially spaced bearings $B_5$ and $B_6$ respectively carried on the intermediate plate 23 and the transmission housing 22. The mainshaft 32 is provided thereon with an input gear or fourth gear 32d which meshes with the idler gear 31a of idler shaft 31 and with a gear 33d integral with a countershaft 33. The countershaft 33 is also formed integral with three further gears 33a, 33b and 33c of differing sizes which are meshed respectively with first, second and third gears 32a, 32b and 32c journalled on the mainshaft 32. The selection of gear ratios is effected by a gear-shift mechanism 14 (See FIG. 1) which is operatively connected through a mechanical linkage 14b to a pair of synchronizers 32e and 32f.

When the first synchronizer 32e is in its neutral position, the first and second gears 32a, 32b are free from the mainshaft 32. The synchronizer 32e acts in the usual manner to establish synchronism in a driving connection between the mainshaft 32 and the first gear 32a or the second gear 32b, depending upon which direction the synchronizer 32e is shifted by an unshown first shift fork of the gear-shift mechanism 14. When the second synchronizer 32f is in its neutral position, the third and fourth gears 32c, 32d are free from the mainshaft 32. The synchronizer 32f acts in the usual manner to establish synchronism in a driving connection between the mainshaft 32 and the third gear 32c or the fourth gear 32d, depending upon which direction the synchronizer 32f is shifted by an unshown second shift fork of the gear-shift mechanism 14.

A reverse gear 32g is formed integral with the second synchronizer 32f and is arranged to be positioned in a common vertical plane with the reverse driving gear 31b when the synchronizer 32f is in its neutral position. If an unshown reverse idler gear is shifted by an unshown third shift fork of the gear-shift mechanism 14 under the neutral condition of synchronizer 32f, the reverse idler gear is brought into engagement with the gears 31b and 32g to establish a reverse torque delivery path between the clutch output member 12a and the mainshaft 32.

The countershaft 33 is supported by a pair of axially spaced bearings $B_7$ and $B_8$ respectively from the intermediate plate 23 and the transmission casing 22 and is located substantially at the same height above the ground level as the mainshaft 32 and in parallel with the same. In FIG. 2, the countershaft 33 is, however, illustrated at a position lower than the mainshaft 32 to clearly depict the meshing engagement of the gear transmission.

Figure 3:
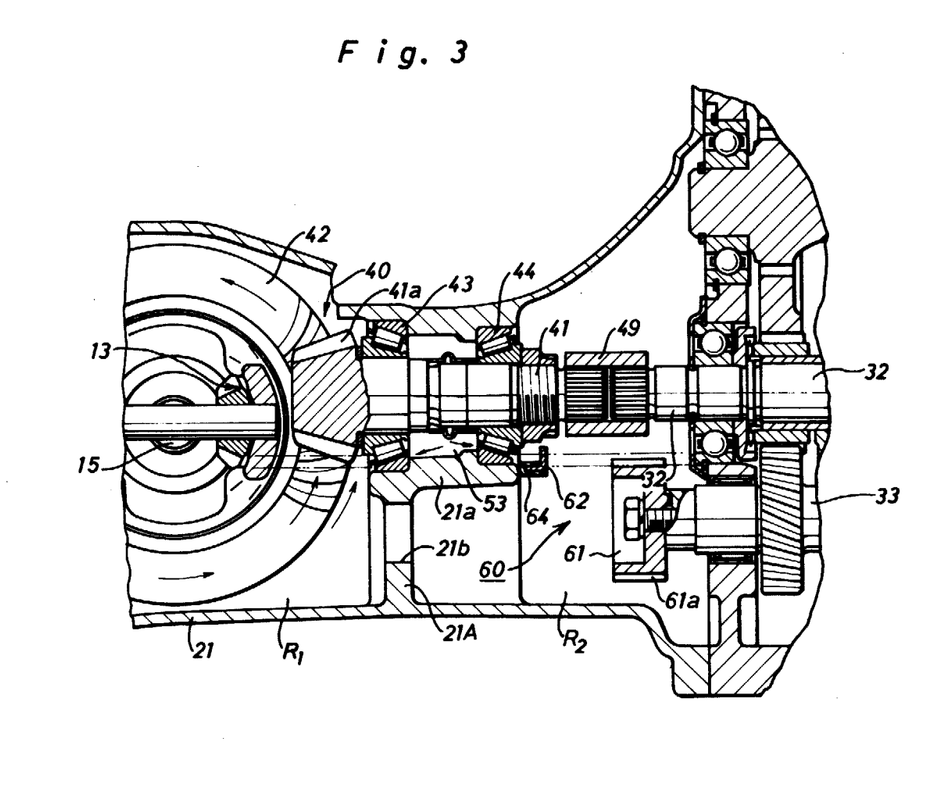
FIG. 3 is an enlarged sectional view of a final drive gearing shown in FIG. 2.
Figure 4:
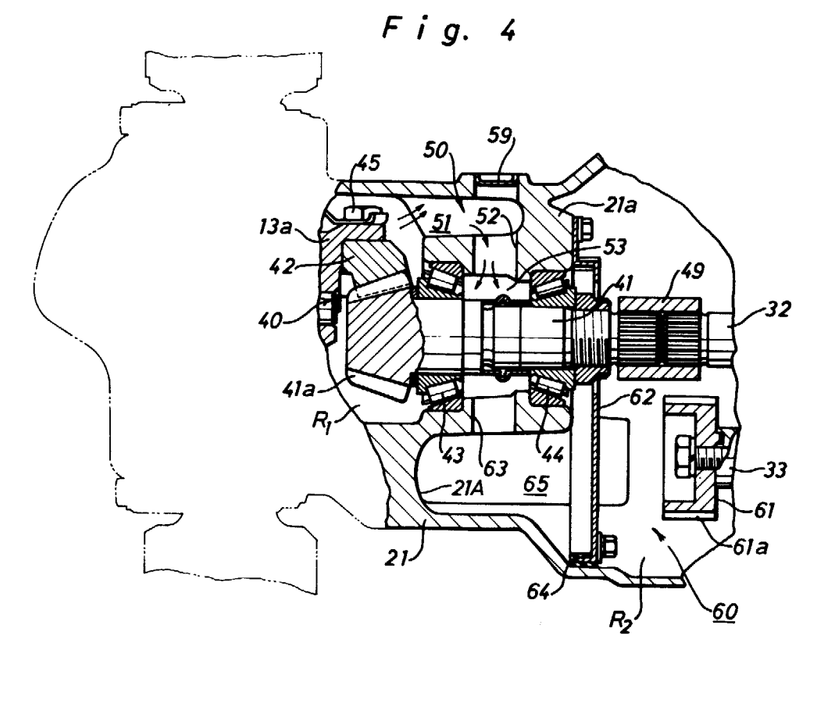
FIG. 4 is an enlarged horizontally sectional view of the final drive gearing of FIG. 2.

As well seen in FIGS. 2 to 4, the final drive gearing 40 has a drive pinion shaft 41 coaxially connected to the mainshaft 32 by means of a spline coupling 49, and the trans-axle casing 21 is provided therein with an upright partition wall 21A subdividing the lower compartment into front and rear chambers $R_1$ and $R_2$. The drive pinion shaft 41 is arranged along the fore-and-aft axis of the vehicle and is supported by a pair of axially spaced tapered roller bearings 43 and 44 carried on a bearing boss 21a of the upright partition wall 21A. A hypoid drive pinion 41a is formed integral with the drive pinion shaft 41 and is meshed with a hypoid crown wheel 42 within the front chamber $R_1$. As shown in FIG. 4, the hypoid crown wheel 42 is secured to a differential casing 13a of unit 13 by bolts 45 and is rotated by the hypoid drive pinion 41a in a counterclockwise direction, as shown in FIG. 3. Furthermore, the upright partition wall 21A is provided at its bottom portion with an axial through hole 21b communicating the front chamber $R_1$ into the rear chamber $R_2$. In addition, a predetermined amount of lubrication oil is stored within the bottom of the housing assembly 20 to dip therein lower portions of the crown wheel 42, the gears on the mainshaft 32, and the gears on the countershaft 33. In FIGS. 2 and 3, dot and dash lines indicate a liquid level of the lubrication oil during operation of the transmission unit, and two dots and dash lines indicate a liquid level of the lubrication oil under inoperative condition of the transmission unit.

Figures 5, 7:
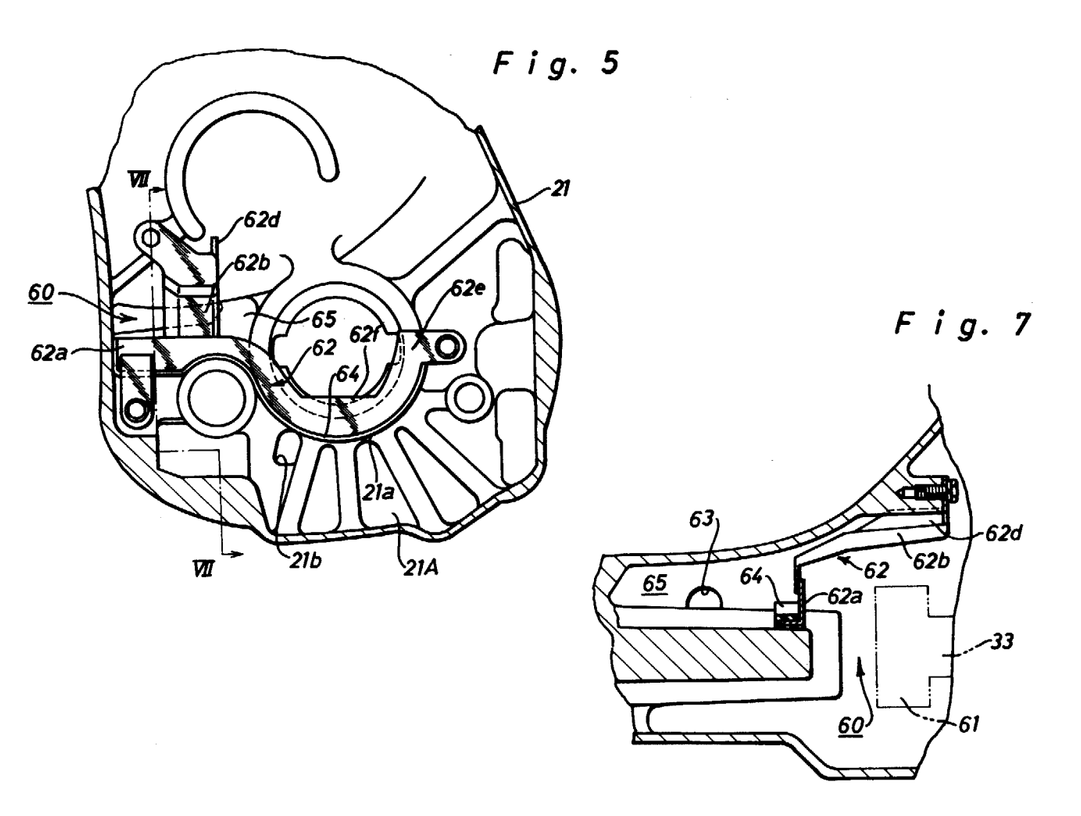
FIG. 5 is an enlarged rear view showing an upright partition wall of the trans-axle casing of FIG. 2.
FIG. 7 is an enlarged sectional view taken along the plane of line VII—VII of FIG. 5.
Figures 6, 8:
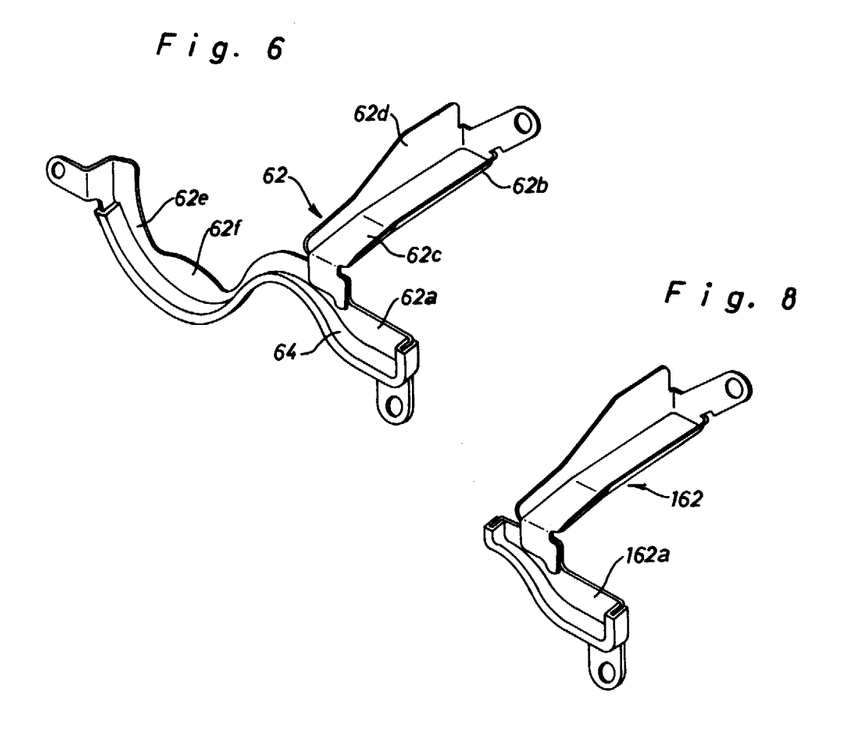
FIG. 6 is a perspective view of an oil receiver shown in FIG. 5.
FIG. 8 illustrates a modified oil receiver.
Figure 9:
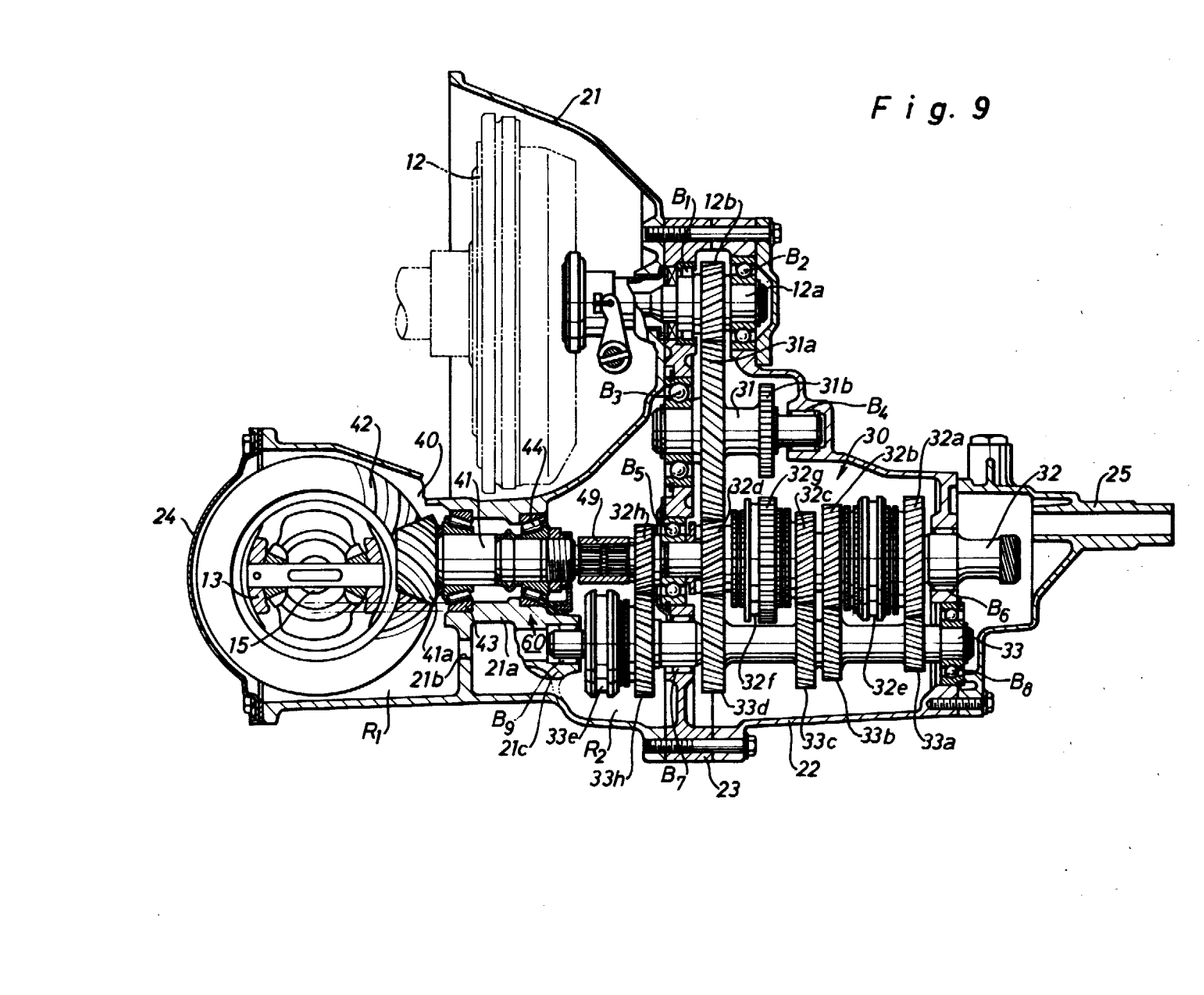
FIG. 9 is a sectional view of another embodiment of the present invention.

Hereinafter a lubricating means 60 in accordance with the present invention will be described in detail with reference to FIGS. 3 to 7. The lubricating means 60 is provided behind the partition wall 21A to lead lubrication oil into the roller bearings 43 and 44. The lubricating means 60 comprises an oil stirring means 61 fixed on the front end of countershaft 33, an oil receiver 62 secured to the rear-face of partition wall 21A and a lateral oil passage 63 drilled through the bearing boss 21a of partition wall 21A (See FIG. 4). The stirring means 61 is in the form of a spur gear and has a plurality of stirring teeth 61a to dip up lubrication oil. As illustrated in FIGS. 5 to 7, the oil receiver 62 includes a lateral gutter member 62a secured to the rear-face of partition wall 21A by way of a sealing band of synthetic rubber 64 which is provided in necessity. The gutter member 62a has an L-letter shape cross-section and is formed with a curved portion 62e to cover the bottom portion of bearing 44, as shown in FIG. 3. The gutter member 62a is further provided with an upright lateral flange 62f of which right-hand portion extends under the drive pinion shaft 41 to form an oil dam, as shown in FIG. 5. Thus, the bearing 44 is dipped at its bottom portion in lubrication oil stored within the oil dam.

As shown in FIGS. 6 and 7, the oil receiver 62 further includes a longitudinal gutter member 62b which is secured at its front end to the upright lateral flange 62f of gutter member 62a to receive lubrication oil picked up by the stirring means 61. The gutter member 62b has a U-shape cross-section and is formed with a groove portion 62c inclined toward the lateral gutter member 62a and with an upright side flange 62d to be splashed with lubrication oil. As shown in FIGS. 4, 5 and 7, the lateral oil passage 63 communicates at its outer end into an axial cavity 65 at the left-hand of partition wall 21A and also communicates at its inner end into an annular space 53 between the bearings 43, 44, as shown in FIG. 4.

In this embodiment, as shown in FIG. 4, there is further provided another lubricating means 50 which comprises an axial cavity 51 opening toward the interior of front chamber $R_1$ at the same side as the crown wheel 42 and a lateral passage 52 to communicate the cavity 51 into the annular space 53 around the drive pinion shaft 41. The axial cavity 51 serves to receive lubrication oil dipped up by rotation of the crown wheel 42, and the lateral passage 52 serves to lead the lubrication oil from the bottom of cavity 51 into the annular space 53, thereby to lubricate both the tapered roller bearings 43, 44. The lateral passages 52 and 63 are aligned in a common axis and fomed by drilling through the housing wall, the lateral passage 52 being closed by a plug 59 at its outer end.

In operation of the transmission unit, assuming that the change-speed gearing 30 is conditioned in its neutral position, rotation torque of the clutch output member 12a is transmitted to the countershaft 33 by means of permanent meshing engagement of the driving gear 12b, the idler gear 31a, the input gear 32d and the countergear 33d. This rotates the stirring spur gear 61 and also rotates the first, second and third gears 32a, 32b, 32c by permanent meshing engagement with the gears 33a, 33b, 33c of countershaft 33. Then, the lubrication oil is stirred up by rotation of the gears of shafts 32, 33 to lubricate the teeth of the change-speed gearing 30 and the bearings $B_5$, $B_6$, $B_7$, $B_8$. In the rear chamber $R_2$ of trans-axle casing 21, the lubrication oil is dipped up by rotation of the spur gear 61 and splashes onto the upper wall of rear chamber $R_2$ and the upright flange 62d of oil receiver 62. Subsequently, the lubrication oil drops into the longitudinal gutter member 62b of oil receiver 62 and flows into the lateral gutter 62a to be stored within the oil dam of gutter 62a. The lubrication oil from the gutter member 62b is further led into the annular space 53 through the axial cavity 65 and lateral passage 63. In this instance, as the drive pinion shaft 41 is stopped, the lubrication oil in annular space 53 flows forwardly to run into the front chamber $R_1$ through the front bearing 43. Meanwhile, the lubrication oil in the dam of lateral gutter 62a floods over the upright flange 62f into the rear chamber $R_2$.

When a selected one of forward speed ratios is established in the change-speed gearing 30 during operation of the transmission unit, the rotation torque of countershaft 33 is transmitted to the mainshaft 32 by way of one of the synchronizers 32e and 32f. This rotates the drive pinion shaft 41 to drive the crown wheel 42 in the counterclockwise or forward direction. Then, the rotation torque of crown wheel 42 is transmitted to the differential gear unit 13 to drive a pair of wheel axles 15. Under this condition, the lubrication oil in rear chamber $R_2$ flows into the lateral gutter member 62a of oil receiver 62 and into the annular space 53 through the axial cavity 65, as described above, while the lubrication oil in front chamber $R_1$ is dipped up by rotation of the crown wheel 42. The dipped up oil directly splashes onto the front roller bearing 43 and partly flows into the annular space 53 by way of the cavity 51 and lateral passage 52. Thus, the lubrication oil supplied into annular space 53 partly flows in the forward direction to lubricate the front bearing 43 and partly flows in the rearward direction to lubricate the rear bearing 44, as shown in FIG. 4. In addition, the rear bearing 44 is also lubricated by lubrication oil in the dam of lateral gutter 62a.

When the reverse torque delivery path is established in the change-speed gearing 30, the reverse driving gear 31b is coupled with the reverse gear 32g by way of the reverse idler gear (not shown) to rotate the mainshaft 32 and drive pinion shaft 41 in a reverse direction. This results in clockwise rotation of the crown wheel 42 in front chamber $R_1$. In this instance, although the lubrication oil flowing into the cavity 51 reduces, the bearings 43, 44 are lubricated by oil supplied into the annular space 53 from the oil receiver 62. It will be also noted that lubrication of the roller bearings 43, 44 can be ensured taking into account low rotation speed of the drive pinion shaft 41 and low frequency of usage in the reverse drive. In parking of the vehicle, some lubrication oil is stored in the dam of oil receiver 62 to lubricate the rear bearing 44. Thus, at start of the vehicle or initial rotation of the drive pinion shaft 41, it is ensured to preliminarily avoid shortage of lubrication oil for the bearing 44.

In the embodiment described above, it is noted that the oil receiver 62 forms the oil dam at its curved portion 62e. As well shown in FIG. 8, however, it is possible to adapt an oil receiver 162 without the oil dam. Furthermore, the stirring means 61 of the embodiment may be mounted on the output mainshaft 32.

In FIGS. 9 to 12, there is illustrated another embodiment of the present invention in which a fifth gear 32h is splined on the mainshaft 32, and the countershaft 33 is rotatably supported at its front end by a roller bearing $B_9$ carried on another bearing boss 21c of the partition wall 21A. The countershaft 33 is further provided thereon with a gear 33h in mesh with the fifth gear 32h and provided with a third synchronizer 33e. The gear 33h is rotatably journalled on the countershaft 33, and the synchronizer 33e serves in its shifted position to provide a driving connection between the gear 33h and the countershaft 33. In addition, the gear ratio of the gears 32h and 33h is designed to provide an over-drive gear train.

Figures 10, 12:
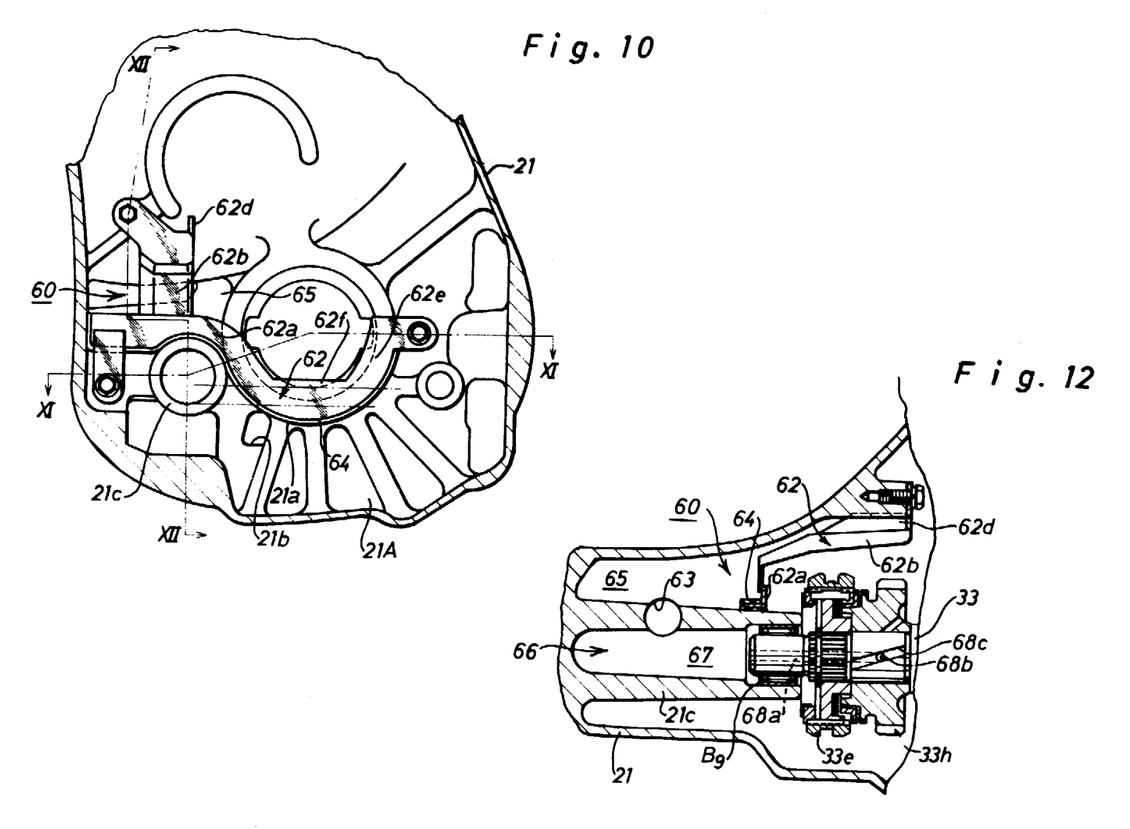
FIG. 10 is an enlarged rear view showing an upright partition wall of the trans-axle casing of FIG. 9.
FIG. 12 is an enlarged sectional view taken along the plane of line XII—XII of FIG. 10.
Figure 11:
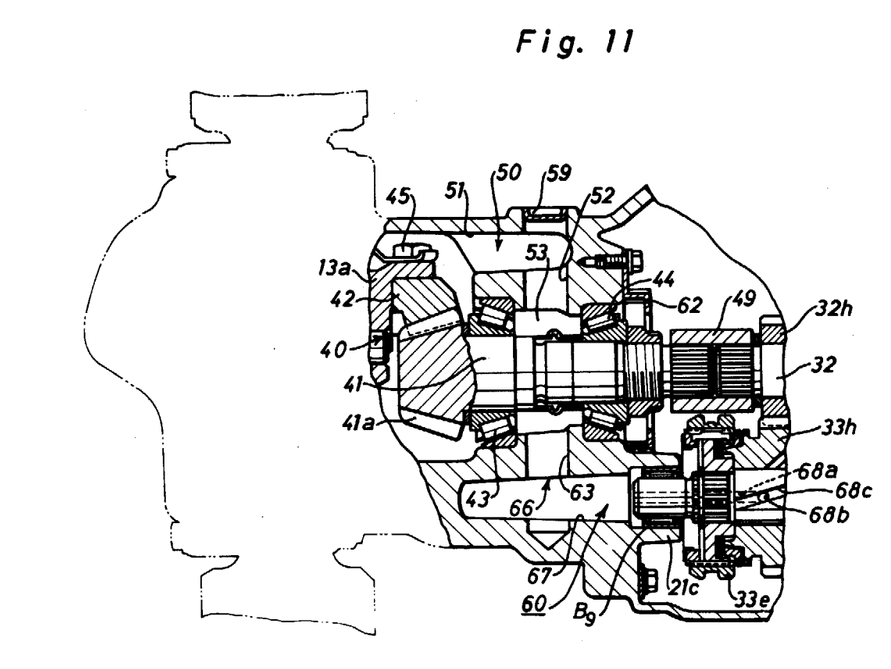
FIG. 11 is an enlarged sectional view taken along the plane of line XI—XI of FIG. 10.

In this embodiment, it is noted that the bearing boss 21c is provided therein with an axial bore 67 which communicates into the axial cavity 65 and the annular space 53 through the lateral oil passage 63, as shown in FIGS. 11 and 12. The countershaft 33 is provided at its front end with an axial passage 68a opening toward the axial bore 67 and includes an outer groove 68c communicated into the axial passage 68a through a radial hole 68b. All other constructions are substantially the same as those in the previous embodiment. Thus, the same reference numerals and characters indicate the same component parts and portions and eliminated are repetition of the explanations already made in the previous embodiment.

When the countershaft 33 is driven by rotation torque from the clutch output member 12a under neutral condition of the change-speed gearing 30, the third synchronizer 33e rotates together with the countershaft 33 to dip up lubrication oil in the rear chamber $R_2$ of trans-axle casing 21, and the first, second and third gears 32a, 32b, 32c are rotated by permanent meshing engagements with the gears 33a, 33b, 33c of countershaft 33 to stir up lubrication oil in the transmission casing 22. Then, the lubrication oil dipped up by the synchronizer 33e splashes onto the upper wall of rear chamber $R_2$ and the upright flange 62d of oil receiver 62 and drops into the longitudinal gutter member 62b. Subsequently, the lubrication oil from the gutter member 62b flows into the lateral gutter 62a and is stored within the oil dam of gutter 62a. The lubrication oil from the gutter 62b is further led into the annular space 53 and the axial bore 67 through the axial cavity 65 and lateral passage 63. Thus, the lubrication oil in the annular space 53 flows forwardly to run into the front chamber $R_1$ through the front bearing 43, and the lubrication oil in the dam of lateral gutter 62a floods over the upright flange 62f into the rear chamber $R_2$. Meanwhile, the lubrication oil in the axial bore 67 returns into the rear chamber $R_2$ through the bearing $B_9$ and flows into the outer groove 68c through the axial passage 68a and radial hole 68b to lubricate the journal portions of gear 33h and synchronizer 33e.

When the rotation torque of countershaft 33 is transmitted to the mainshaft 32 by way of one of the synchronizers 32e and 32f, the fifth gear 32h rotates together with the mainshaft 32 to drive the gear 33h, and the drive pinion shaft 41 rotates to drive the crown wheel 42 in the counterclockwise or forward direction. Then, the rotation torque of crown wheel 42 is transmitted to the differential gear unit 13 to drive the wheel axles 15. Under this condition, lubrication oil in the rear chamber $R_2$ is dipped up by rotation of the gears 32h, 33h and the synchronizer 33e, while the lubrication oil in front chamber $R_1$ is dipped up by rotation of the crown wheel 42. Thus, the lubrication oil flows into the annular space 53 and the axial bore 67 by means of the oil receiver 62 to lubricate the bearings 43, 44, $B_9$ and the journal portions of gear 33h and synchronizer 33e, as described above. Furthermore, the lubrication oil dipped up by the crown wheel 42 splashes onto the front bearing 43 and flows into the annular space 53 by way of the cavity 51 and lateral passage 52 to ensure lubrication of the bearings 43, 44 during high speed operation of the transmission unit.

When the third synchronizer 33e is shifted to transmit the rotation torque of countershaft 33 to the mainshaft 32 by way of the gears 33h and 32h, the drive pinion shaft 41 rotates to drive the crown wheel 42 in the counterclockwise direction. Then, the rotation torque of crown wheel 42 is transmitted to the differential gear unit 13 to drive the wheel axles 15. Under this condition, lubrication oil in the rear chamber $R_2$ is dipped up by rotation of the gears 33h, 32h and the synchronizer 33e to lubricate the bearings 43, 44, $B_9$ and the journal portions of gear 33h and synchronizer 33e, as described above, while lubrication oil in the front chamber $R_1$ is dipped up by rotation of the crown wheel 42 to ensure lubrication of the bearings 43, 44. In this instance, it will be noted that the lubrication oil flowing into the outer groove 68c of countershaft 33 serves to prevent fretting defacements at the journal and thrusting portions of gear 33h and synchronizer 33e.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a power transmission unit, for a motor vehicle, comprising a trans-axle casing secured at its upright front seating face to a cylinder block of an engine and having an upper compartment to contain therein a disengageable coupling for connection to a crankshaft of said engine and a lower compartment to contain therein a final drive gearing and a differential gear unit, and a transmission casing sealingly jointed at its upright front seating face to the upright rear seating face of said trans-axle casing to contain therein a change-speed gearing drivingly connected to an output member of said disengageable coupling, said change-speed gearing having a countershaft with counter gears for selectively driving respective change-speed gears on a mainshaft which includes an input gear arranged to be driven by rotation torque of said output member to drive one of said counter gears, and in which said trans-axle casing is provided therein with an upright partition wall to subdivide the lower compartment into front and rear chambers, and said final drive gearing includes a drive pinion shaft supported by a pair of axially spaced front and rear bearings carried on said partition wall and having a drive pinion located in the front chamber, said drive pinion shaft being coaxially connected to said mainshaft and said drive pinion being meshed with a crown wheel to drive said differential gear unit, the improvement comprising:

stirring means mounted on one of said mainshaft and countershaft to dip up lubrication oil in the rear chamber, an oil receiver secured to the rear-face of said partition wall to receive the lubrication oil dipped up by rotation of said stirring means, an axial cavity provided on said partition wall adjacent said drive pinion shaft and opening toward the rear chamber to receive the lubrication oil from said oil receiver, and a lateral passage provided through said partition wall to communicate said cavity into an annular space around said drive pinion shaft between said bearings.

2. A power transmission unit as claimed in claim 1, wherein said stirring means is a gear mounted on said countershaft and located under said oil receiver.

3. A power transmission unit as claimed in claim 1, wherein said stirring means comprises a change-speed gear fixed to said mainshaft, a counter gear journalled on said countershaft and in mesh with said change-speed gear, and a synchronizer journalled on said countershaft to establish synchronism in a driving connection between said counter gear and said countershaft, said additional gears and synchronizer being arranged under said oil receiver.

4. A power transmission unit as claimed in claim 3, wherein said additional gears are designed to provide an over-drive gear train.

5. A power transmission unit as claimed in claim 1, wherein said oil receiver comprises a lateral gutter member secured to the rear-face of said partition wall to lead lubrication oil into said axial cavity and a longitudinal gutter member secured at its front end to said lateral gutter member and at its rear end to an inner wall of said trans-axle casing to receive the lubrication oil dipped up by rotation of said stirring means.

6. A power transmission unit as claimed in claim 5, wherein said lateral gutter member includes an upright lateral flange extending under said drive pinion shaft to form an oil dam behind said rear bearing, and said longitudinal gutter member includes an upright longitudinal flange to be splashed with lubrication oil.

7. A power transmission unit as claimed in claim 6, wherein a lateral sealing band is interposed between said lateral gutter member and the rear-face of said partition wall to seal the bottom of said oil dam.

8. A power transmission unit as claimed in claim 1, further comprising a second axial cavity provided on said partition wall adjacent said drive pinion shaft and opening toward the front chamber to receive lubrication oil dipped up by rotation of said crown wheel and a second lateral passage provided through said partition wall to communicate said second cavity into said annular space between said bearings.

9. A power transmission unit as claimed in claim 8, wherein said first-named lateral passage and said second lateral passage are coaxially formed by drilling through said trans-axle casing, said second lateral passage being closed by a plug at its outer end.

10. A power transmission unit as claimed in claim 1, wherein said partition wall includes a bearing boss for rotatably supporting an extended front end of said countershaft, said bearing boss being located under said axial cavity and being provided therein with an axial bore in open communication with said axial cavity through said lateral passage.

11. A power transmission unit as claimed in claim 10, wherein said stirring means comprises a change-speed gear fixed to said mainshaft, a counter gear journalled on said countershaft and in mesh with said change-speed gear, and a synchronizer journalled on said countershaft to establish synchronism in a driving connection between said counter gear and said countershaft, said additional gears and synchronizer being arranged under said oil receiver, and wherein said countershaft is provided therein with an axial passage opening toward said axial bore of said bearing boss and thereon with an outer groove in open communication with said axial passage, said outer groove being located at the journal portions of said additional counter gear and synchronizer.

* * * * *